United States Patent [19]

Shemwell

[11] Patent Number: 4,536,086
[45] Date of Patent: Aug. 20, 1985

[54] HOLOGRAPHIC FIGURE SENSOR
[75] Inventor: David M. Shemwell, Dallas, Tex.
[73] Assignee: The Perkin-Elmer Corporation, Norwalk, Conn.
[21] Appl. No.: 442,940
[22] Filed: Nov. 18, 1982
[51] Int. Cl.³ .............................................. G01B 9/021
[52] U.S. Cl. ..................................... 356/348; 356/360
[58] Field of Search ................. 356/347, 348, 359, 360

[56] References Cited

U.S. PATENT DOCUMENTS 3,860,346 1/1975 Kersch et al. ........................ 356/348
4,239,392 12/1980 Pohle .................................... 356/354

OTHER PUBLICATIONS

Erickson, "Investigation-Monitoring and Control of Large Telescope Performance", NASA CR-111811, Accession No. N71-19019, CNT157, Sep. 1970.

Primary Examiner—Davis L. Willis
Assistant Examiner—Matthew W. Koren
Attorney, Agent, or Firm—Thomas P. Murphy; Edwin T. Grimes; Francis L. Masselle

[57] ABSTRACT

Methods and means are provided for making measurements of the optical figure of a remote thin deformable mirror (16). Relatively small holographic elements (24) are formed on portions of the mirror (16). A laser beam is transmitted to illuminate the elements (22). Diffracted laser beam signals from the elements (22) are used to produce a hologram or corrector plate (34) which is subsequently used to produce reference signals representative of the original shape of the mirror. When the holographic elements (22) of the mirror are subsequently illuminated by a laser beam, the diffracted signals reconstruct the reference signals recorded or stored on the corrector plate (34). The output signal represents the deviations of the mirror from its original shape.

5 Claims, 7 Drawing Figures

HOLOGRAPHIC FIGURE SENSOR

BACKGROUND OF THE INVENTION

Holography has been widely used extensively for viewing remote objects and measuring characteristics relating thereto. Generally, in such systems, coherent light from a common source is divided into two components by a beam splitter, for example. A first component is then used to illuminate an object, the image of which is to be recorded. A light wave reflected from the object, containing the optical information relating thereto, is directed to a hologram plate member. The second component operates as a known reference and interferes with the reflected signal from the object to create a pattern on the plate member uniquely related to the object. A hologram is the term commonly associated with a diffraction pattern recorded in this manner.

The present invention utilizes techniques employed in holography in order to obtain information relating to the optical figure of a remote object such as a large mirror remotely disposed in space.

Relatively large lightweight mirrors are used in space programs for a number of purposes. The extension of monolithic mirror designs with significantly larger apertures is highly desirable. However, because of the increased structure required for increasing the size of such mirrors, recent development have led to the consideration of thin, actively controlled, deformable mirrors.

A deformable mirror, which may be 2.5 cm or less in thickness, is generally so thin that it must be supported and controlled by a large number of actuators attached to the rear of the mirror. The result is a dynamic optic whose figure must be regularly monitored to ensure proper performance of the system involved.

In order to actively hold the mirror in the proper shape, continuous or frequent measurements of the optical figure of the mirror must be made.

There have been a variety of schemes presented the past for figure sensing from the focal plane; one such method is the full-aperture holographic zone plate. The zone plate approach is attractive since it provides full-aperture figure information which can be easily handled by interferometric figure sensors, and it does not require modification of the mirror surface other than the coating.

The basic idea of the zone plate figure samples is to place in very shallow relief, a weak diffractive optical element (zone plate) on the surface of the primary mirror. This zone plate is an optical element whose center of curvature coincides with the focal point of the primary mirror. When the zone plate is illuminated from the focus of the primary, the zone plate retroreflects the illuminating light. Since distortions in the mirror are translated one-to-one to distortions in the retroreflected light from the hologram, one may indeed sample the figure of the mirror in this fashion.

The hologram could be embossed on the surface of the mirror using photoresist and two coherent point sources. Techniques for exposing the hologram in conventional fashion have been done. Unfortunately, a very large mirror would require very large laser beams and, since the light must be of a narrow spectral range, this means the beams would have very low energy densities. As a result, impractically long exposure times would be necessary. To date, no one has successfully fabricated a zone plate the size of a large primary mirror. Limitations on the laser source make it impractical to obtain large holograms, in the order of meters, from a single exposure.

OBJECTS OF THE INVENTION

It is an object of this invention to provide improved means and methods for measuring deviations in the optical figure of a remote thin lightweight deformable mirror.

It is a further object of this invention to provide an improved means and methods for measuring deviations in the dimensions of a remote mirror disposed in space utilizing holographic techniques.

It is still a further object of this invention to provide improved measurement techniques which makes it possible to use extremely large lightweight mirrors in space.

BRIEF SUMMARY OF THE INVENTION

Methods and means for making measurements of the optical figure of a thin deformable mirror located at remote point, near the mirror's focus, includes covering portions of the surface of the mirror with a photoresist material. A high intensity laser beam is used to expose these portions to produce holographic elements thereon. The holographic elements are subsequently illuminated with a laser beam to cause light beams to be diffracted which are representative of the optical figure of a mirror, to the focal plane where a hologram or corrector plate is made representing the diffracted signals. This corrector plate is subsequently used for future measurements of the mirror. Subsequent laser light diffracted from the hologram elements on the mirror reconstruct the hologram signals from the corrector plate to produce an optical quality output signal. The output signal is representative of the deviations of the mirror from its original shape. This signal may be combined in an interferometer to produce an interferogram of the mirror to be used to operate actuators secured to the rear of the mirror to bring a deformed mirror back to its original shape.

Other objects and advantages of the present invention will be apparent and suggest themselves to those skilled in the art, from a reading of the following specification and claims taken in conjunction with the accompanying drawings.

DETAILED DESCRIPTION OF THE PREFERREED EMBODIMENTS

Basically, the present invention involves a first step of recording holograms of small sizes over the surface of a deformable mirror. This may be done by first putting photoresist material on small selected areas on the surface of the mirror. A laser beam is transmitted to expose the photoresist surfaces. Diffracted beams from the mirror are then used to create reference signals which are representative of so-called perfect mirror. A hologram or corrector plate is made from the reference signals representing that perfect mirror. This hologram or corrector plate is the reference used in connection with future measurements and corrections. Subsequent diffracted signals from the mirror reconstruct the reference hologram wave and the differences in the output signals from the original reference wave represent deviations of the mirror from its original shape.

As is well known, limitations on the laser source make it impractical to obtain extremely large holograms on the order of meters from a single hologram. However, it is possible to expose the entire surface of a large primary mirror by a step-and-repeat process.

If a point source of a relatively high frequency is used to illuminate a sub-aperture of the mirror, a relatively intense beam may be used to illuminate a photoresist material on the mirror to keep the exposure time required relatively short. Repeated direction of the beam to expose non-overlapping patches on the mirror can then be used to expose the entire surface of the hologram.

The present invention involves the creation of a number of small zone plates comprising holographic elements on the surface of a mirror to form a collection of zone plates whose focal points line very closely together. When these zone plates or hologram elements are illuminated, each small zone focuses light to its focal point.

Figure 1:
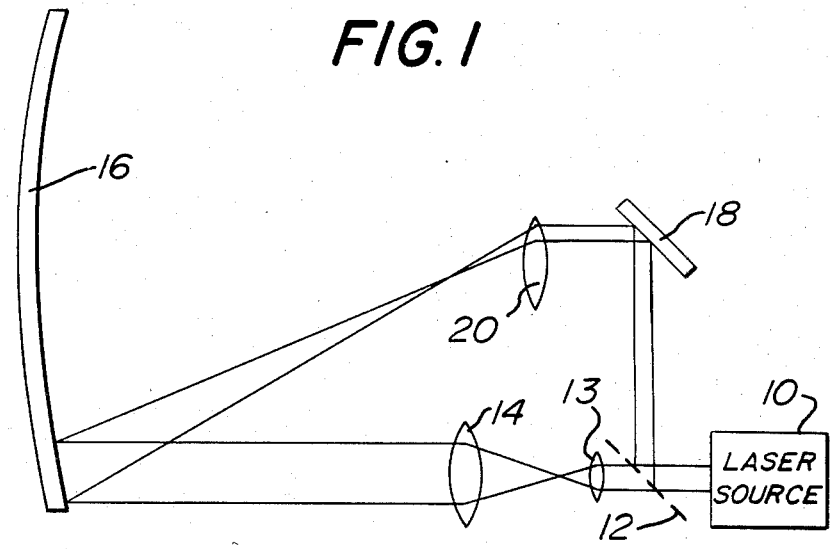
FIG. 1 is a diagram illustrating a system for exposing selected areas of photoresist material to form zone plates on the surface of a mirror in accordance with the presnet invention.

Referring to FIG. 1, zone plates are generated holographically on selected areas on the surface of a mirror by interfering coherent light from a plane wave and a point source or from two point sources and recording the pattern on a light sensitive material. A laser source 10 directs a laser beam to a beam splitter 12 which divides the beam into two components, one component being directed through a lens 13 and a lens 14 which may comprise a telescope to a surface on a mirror 16. The other component from the beam splitter 12 is directed to a fold mirror 18, through a lens 20 to the same surface on the mirror 16. These beams act to expose a photoresist material on the surface of the mirror, as illustrated in FIGS. 2a, 2b, 2c and 2d.

Figure 2A:
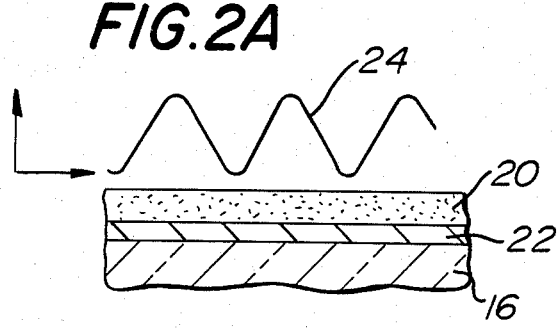
FIGS. 2a, 2b, 2c and 2d illustrate various steps in a process by which zone plates may be formed on the mirror as illustrated in FIG. 1.

Referring to FIG. 2a, one method of producing zone plates on the surface of the mirror is illustrated. A thin film of photoresist material 20 may be a thin metal film 22 which covers selected areas on the surface of the mirror 16. The films may be applied by dipping, spraying or misting techniques, for example. An interference pattern is transferred to the mirror by a series of transfer steps.

Figure 2B:
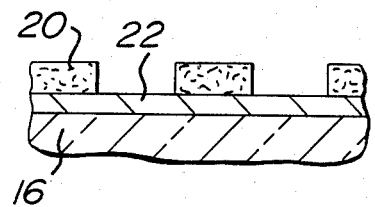
Figure 2C:
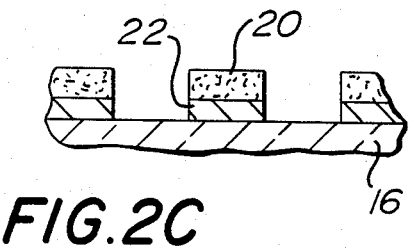
Figure 2D:
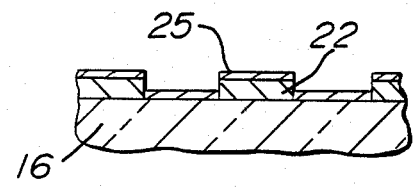

The interferring waves transmitted to the photoresist material 20 from the laser beam is illustrated by a composite waveform 24. The interference peaks and nulls in the waveform 24 leaves a modulation in the resist material 20, in a development step as illustrated in FIG. 2b. This modulation is transferred to the surface of the mirror 16 by chemical or ion etching away of the thin metal film 22 in the exposed areas of the photoresist material, as illustrated in FIG. 2c. After etching and removal of the photoresist material, a reflective coating 25 is placed over the surface of the mirror and the thin metal areas forming the zone plates.

In a working embodiment of the present invention, a Shipley AZ photoresist was applied to the mirror spinning at 3600 rpm for 30 seconds to provide a very uniform coating approximately half a micron thick. Zone plates were exposed on non-overlapping portions of the mirror using beams as illustrated in FIG. 1. The photoresist was developed using AZ351 developer for 30 seconds leaving zone plate patterns in relief on the surface of the mirror.

When the mirror was reilluminated, the diffracted light from the zone plates was imaged onto a photosensitive plate by a field lens. This light was combined with a plane wave to form a holographic corrector plate. When the system was subsequently reilluminated, the light diffracted from the mirror was imaged onto the holographic corrector plate which in turn reconstructed the plane wave. The plane wave was combined with another plane wave to form an interferogram of the mirror.

The process of exposing the photoresist material on the mirror comprises a step-by-step process in which a relatively narrow laser beam of high intensity is moved from point-to-point. Because of the high intensity beam, relatively fast exposure times are achieved.

With the zone plates comprising holographic elements covering parts of the surface of the mirror 16, the methods and means for detecting and correcting for variations in the mirror may now be employed, in accordance with the present invention. As mentioned, the mirror 16 may comprise a relatively thin mirror supported and controlled by a large number of actuators. The optical figure of the mirror may be continuously or regularly monitored to assure that it is operating properly.

Figure 3:
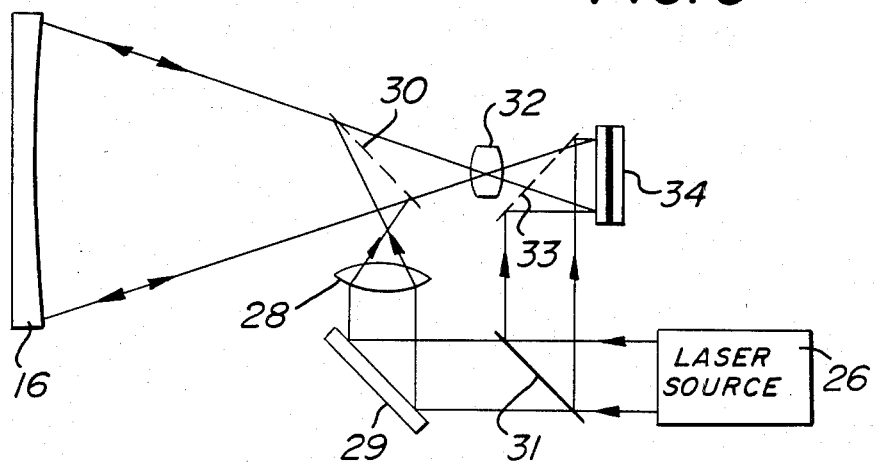
FIG. 3 illustrates a system for producing a hologram to be used as a corrector or reference plate for future measurements.

Referring to FIG. 3, a laser beam may be generated by a source 26, reflected by element 29, through a lens 28 to a beam splitter 30. The beam from the beam splitter 30 is directed to the surface of the mirror 16 to illuminate the set of holographic sampling areas or zone plates to produce a number of wavefronts converging to focus in the same general area. The plurality of zone plates thereon comprises the holographic elements discussed in connection with FIGS. 1 and 2.

The diffracted signals from the mirror 16 are directed back to the beam splitter 30. The signals from the beam splitter 30 are transmitted through a lens 32 to a hologram plate 34 where they are interfered with a plane wave from the same laser source 26, which transmits a laser signal through element 31 to beam splitter 33. A hologram, representing the signals from the zone plates on the mirror 16, is recorded on the hologram plate 34. The hologram recorded may be considered as representative of the shape of the mirror 16 made under certain predetermined known conditions. The recorded hologram or plate 34 may be considered as representative of a perfect mirror from which deviations therefrom may be measured and controlled. As will be seen, the recorded hologram in the plate 34 may be considered as a reference signal which is combined with future received signals to determine deviations in the mirror from the time of the initial making of the hologram plate 34. Hence the hologram plate 34 may be considered as a corrector plate.

Figure 4:
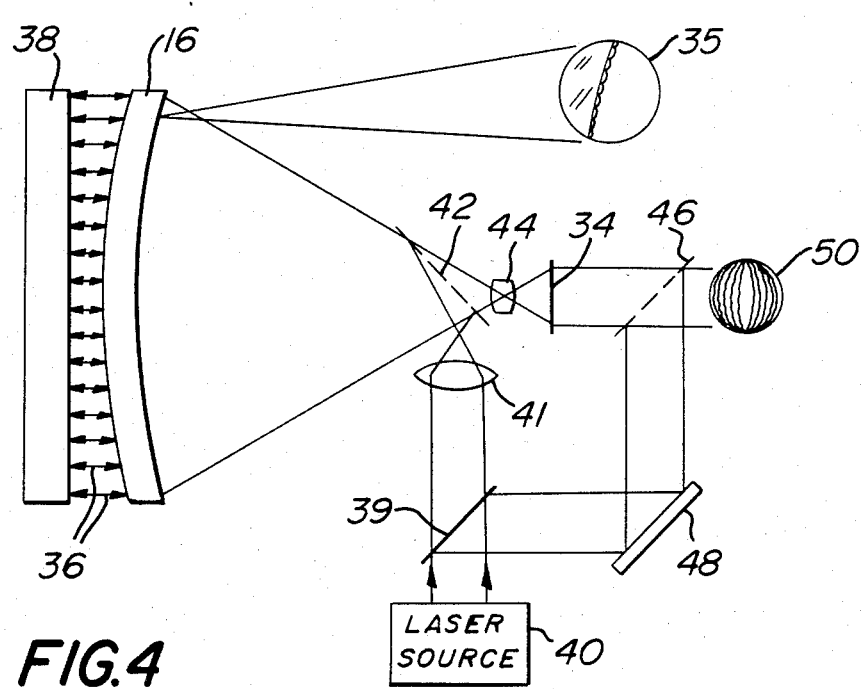
FIG. 4 illustrates a system for handling signals reflected from zone plates on a mirror disposed in space to measure deviations in the surface of the mirror from a fixed reference previously made.

Referring to FIG. 4, the mirror 16 is illustrated as being secured to and supported by a plurality of actuator elements 36. The actuator elements may be controlled by electrical signals from a control unit 38. These actuator elements may be used to provide corrections in the shape of the mirror if it has deformed from its original shape. The control signals for operating the actuator element, and means for correcting the shape of a deformed mirror are not directly related to the present invention and therefore will not be described in detail.

A laser beam is transmitted from a laser source 40 through a beam splitter 39 and a lens 41 to a beam splitter 42. The beam from the beam splitter 42 is transmitted to the surface of the mirror 16, which includes the zone plates, previously described, such as a zone area 35 illustrated in FIG. 4.

Diffracted signals from the zone plates on the mirror 16 are directed to the beam splitter 42, where they are split into two components. One component passes through a lens 44 to the hologram or corrector plate 34. This is the same plate 34 described in connection with FIG. 3 which includes a hologram record for producing reference signals representative of the original physical surface of the mirror 16.

The output signal from the corrector plate 34 is directed to a beam splitter 46. A plane wave from the laser source 40 is directed from the beam splitter 39 to a fold mirror 48. The reflected plane wave signal from the mirror 48 is transmitted to the beam splitter 46 where it is mixed with the signal from the corrector plate 34. The resulting signals from the beam splitter 46 form an interferogram 50. Deviations or errors in the dimensions of the mirror 16 from its original condition will be represented by changes in the interference pattern in the interferometer. Various control means, not illustrated, may be employed in connection with the interferometric data to be used to operate the actuator elements 36 to bring back the mirror to its original position as when the hologram plate 34 was made.

The present invention has made it possible to in effect expose the entire surface of a mirror using a step-and-repeat process. Because only small sub-apertures of the mirror are used, relatively high intensity beams may be used to shorten the exposure time. As pointed out, it is impractical to obtain extremely large holograms from a single exposure. The signals diffracted from the holograms covering small areas of the mirror combine, when used in conjunction with the field lens and corrector plate, to produce a total signal which is equivalent to a reading from the total surface of the mirror.

The holographic corrector plate produces a coherent summation of the independent zone plates. The overall result is that the figure of extremely large mirrors may be monitored as if a single large zone plate had been produced on the mirror.

I claim:

1. A method of making measurements of the optical figure of a thin flexible mirror from a point near the mirror focus, comprising:
    (a) forming small holographic elements which when taken together, cover the entire mirrors surface;
    (b) illumainting said holographic elements with a laser beam signal from a source to cause first signals to be diffracted from said holographic elements towards the focal plane of the mirror;
    (c) a field lens;
    (d) directing said first reflected signals through said field lens to a hologram member to record a hologram thereon representative of the optical figure of said mirror;
    (e) repositioning said hologram member to permit use as a source of reference signals for subsequent measurements of said mirror;
    (f) illuminating said holographic elements on said mirror with a laser signal to cause second signals to be diffracted therefrom;
    (g) directing said second diffracted signals through said hologram member to produce a corrected output signal; and
    (h) directing said corrected output signal to an interferometer to indicate dimensional deviations in said optical figure of said mirror from the optical figure recorded on said hologram member.

2. A method as set forth in claim 1 wherein an additional step is provided to combine said first reflected signals with plane reference signals to record said hologram on said hologram member.

3. A method as set forth in claim 2 wherein an additional step is provided of mixing said correction signal with plane wave signals to form an interference pattern.

4. A system for making measurements of the optical figure of a thin flexible mirror located at the focal plane comprising:
    (a) a plurality of hologram elements disposed at selected areas on the surface of said mirror;
    (b) a laser beam source for illuminating said hologram elements to cause first diffracted signals to be diffracted therefrom;
    (c) means for combining said first diffracted signals with a reference signal to produce first combined signals;
    (d) means for directing said first combined signals to a hologram member to record a hologram thereon representative of the optical figure of said mirror;
    (e) means for reilluminating said hologram elements on said mirror with said laser beam source to cause second signals to be diffracted therefrom,
    (f) means for directing said second diffracted signals through said hologram member to produce a corrected signal;
    (g) an interferometer; and
    (h) means for directing said corrected signal to said interferometer to indicate dimensional deviations in said optical image of said mirror from the image produced by said first reflected signals on said hologram member.

5. A system as set forth in claim 4 wherein means are provided to mix said correction signal with reference signals comprising plane waves prior to directing them to said interferometer.

* * * * *